US012755537B2

(12) United States Patent
Naito

(10) Patent No.: US 12,755,537 B2
(45) Date of Patent: Oct. 6, 2026

(54) FOREIGN OBJECT RECOGNITION SYSTEM

(71) Applicant: KOMATSU LTD., Tokyo (JP)

(72) Inventor: Shinichi Naito, Tokyo (JP)

(73) Assignee: KOMATSU LTD., Tokyo (JP)

( * ) Notice: Subject to any disclaimer, the term of this patent is extended or adjusted under 35 U.S.C. 154(b) by 266 days.

(21) Appl. No.: 18/832,154

(22) PCT Filed: Feb. 21, 2023

(86) PCT No.: PCT/JP2023/006300

§ 371 (c)(1),
(2) Date: Jul. 23, 2024

(87) PCT Pub. No.: WO2023/195256

PCT Pub. Date: Oct. 12, 2023

(65) Prior Publication Data

US 2025/0182485 A1 Jun. 5, 2025

(30) Foreign Application Priority Data

Apr. 4, 2022 (JP) ................................ 2022-062383

(51) Int. Cl.
*G06V 20/50* (2022.01)
*F15B 19/00* (2006.01)
(Continued)

(52) U.S. Cl.
CPC .............. *G06V 20/50* (2022.01); *F15B 19/00* (2013.01); *F15B 21/041* (2013.01); *G06T 7/0002* (2013.01)

(58) Field of Classification Search
CPC ...... B60T 13/745; B60T 13/686; B60T 7/042; B60T 8/4081; B60T 13/662;
(Continued)

(56) References Cited

U.S. PATENT DOCUMENTS

2010/0293928 A1* 11/2010 Kamiya ................ E02F 9/0883 60/301
2020/0244143 A1* 7/2020 Kiyooka .................. B60K 1/00
(Continued)

FOREIGN PATENT DOCUMENTS

| | | | |
|---|---|---|---|
| CN | 108026940 | B | 9/2020 |
| JP | 2020-146673 | A | 9/2020 |
| JP | 2020-159460 | A | 10/2020 |

OTHER PUBLICATIONS

Extended European Search Report received for EP Application No. 23784549.0, mailed on Oct. 31, 2025, 11 pages.
(Continued)

*Primary Examiner* — Alex Kok S Liew
(74) *Attorney, Agent, or Firm* — Spencer Fane LLP

(57) ABSTRACT

A foreign object recognition system includes a housing including a tank configured to store oil, an oil supply channel attached to the housing, and a foreign object recognition device. The tank includes a first space, a second space communicating with the first space, a strainer to separate out foreign objects contained in oil flowing from the second space into the oil supply channel, and a partition wall disposed between the first space and the second space and extending downward from above. The foreign object recognition device recognizes a foreign object located downward of the partition wall.

9 Claims, 5 Drawing Sheets

(51) Int. Cl.
*F15B 21/041* (2019.01)
*G06T 7/00* (2017.01)

(58) Field of Classification Search
CPC ........... B60T 2270/82; B60T 2270/402; B60T 17/22; B60T 13/146; B60T 2270/404; B60T 2270/403; B60T 11/26; B60T 13/142; B60T 17/221; B60T 2220/04; B60T 2270/10; B60T 2270/413; B60T 8/17; B60T 8/171; B60T 8/326; B60T 8/4018; B60T 11/20; B60T 11/22; B60T 13/148; B60T 13/161; B60T 13/166; B60T 13/167; B60T 13/58; B60T 13/62; B60T 17/225; B60T 2270/30; B60T 2270/406; B60T 2270/414; B60T 2270/60; B60T 2270/602
See application file for complete search history.

(56) References Cited

U.S. PATENT DOCUMENTS

| | | | |
|---|---|---|---|
| 2021/0001252 | A1 | 1/2021 | Fukuda et al. |
| 2021/0062476 | A1 | 3/2021 | Chikugo et al. |
| 2022/0050058 | A1 | 2/2022 | Sasaki et al. |

OTHER PUBLICATIONS

The International Search Report for the corresponding international application No. PCT/JP2023/006300, issued on Apr. 4, 2023.

* cited by examiner

FOREIGN OBJECT RECOGNITION SYSTEM

CROSS-REFERENCE TO RELATED APPLICATIONS

This application is a U.S. National stage application of International Application No. PCT/JP2023/006300, filed on Feb. 21, 2023. This U.S. National stage application claims priority under 35 U.S.C. § 119 (a) to Japanese Patent Application No. 2022-062383, filed in Japan on Apr. 4, 2022, the entire contents of which are hereby incorporated herein by reference.

BACKGROUND

Technical Field

The present disclosure relates to a foreign object recognition system.

Background Information

Conventionally, work vehicles such as bulldozers and wheel loaders are provided with a hydraulic apparatus that supplies oil to a predetermined apparatus (e.g., transmission, axle, brake apparatus, etc.).

The hydraulic apparatus is provided with a tank for storing oil, a strainer disposed inside the tank, and a hydraulic pump for discharging oil that has passed through the strainer.

JP 2020-159460A proposes a technique for optically recognizing foreign objects contained in the oil discharged from the hydraulic pump.

SUMMARY

The technique of JP 2020-159460A is for recognizing fine foreign objects contained in oil that has passed through a strainer and is thus not able to recognize coarse foreign objects separated out by the strainer.

An object of the present disclosure is to provide a foreign object recognition system capable of quickly and accurately recognizing coarse foreign objects contained in oil.

A foreign object recognition system according to the present disclosure is provided with a housing including a tank configured to store oil, an oil supply channel attached to the housing, and a foreign object recognition device. The tank includes a first space, a second space communicating with the first space, a strainer configured to separate out foreign objects contained in oil flowing from the second space into the oil supply channel, and a partition wall disposed between the first space and the second space and extending downward from above. The foreign object recognition device is configured to recognize the foreign object located downward of the partition wall.

According to the present invention, a foreign object recognition system capable of quickly and accurately recognizing coarse foreign objects contained in oil can be provided.

DETAILS DESCRIPTION OF EMBODIMENT(S)

Transmission 1

Figure 1:
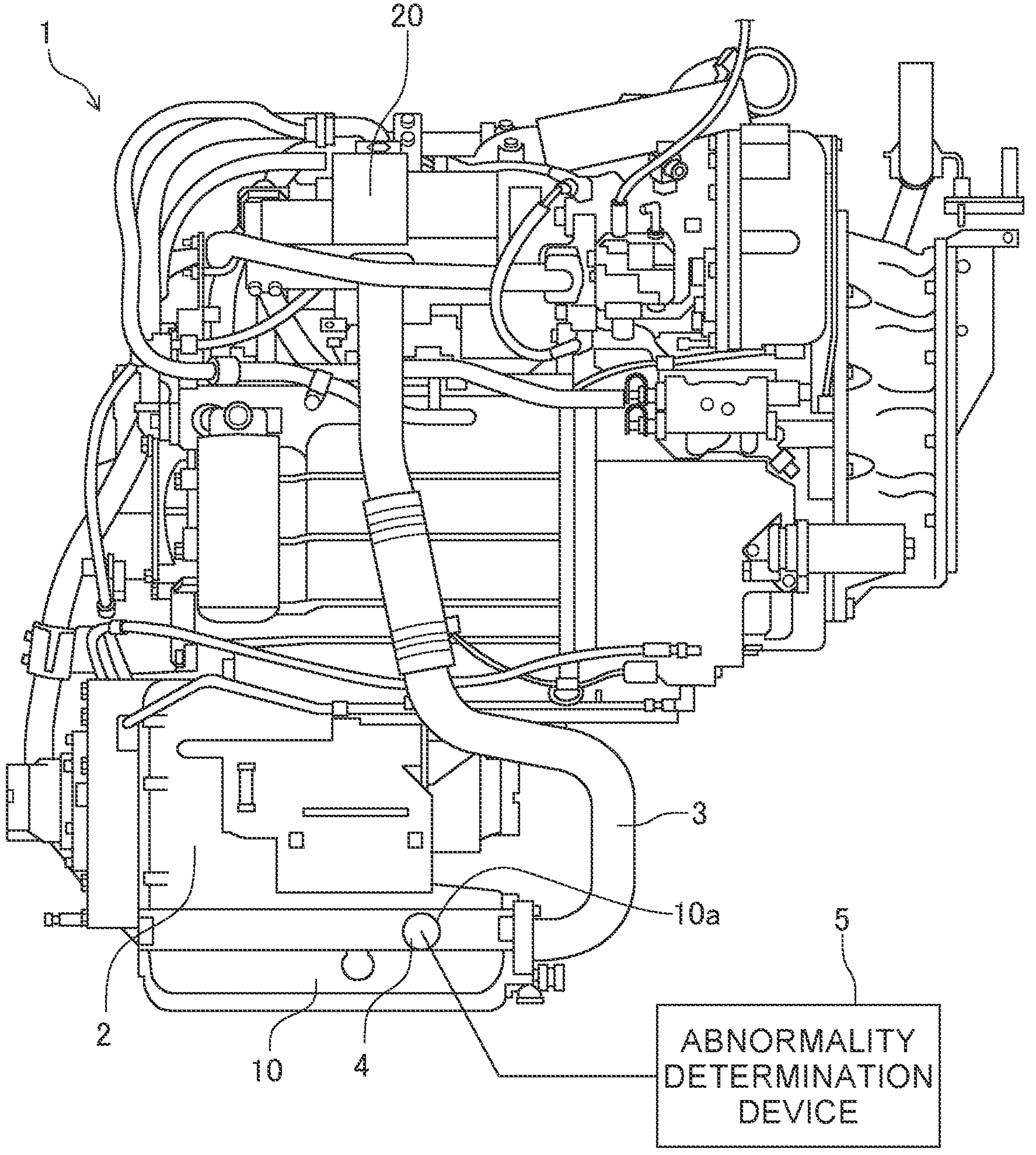
FIG. 1 is a side view of a transmission according to an embodiment.

FIG. 1 is a side view of a transmission 1 according to an embodiment. Herein, "up" and "down" mean "up" and "down" based on the vertical direction.

The transmission 1 is installed in a work vehicle such as a bulldozer or a wheel loader. The transmission 1 includes a housing 2, an oil supply channel 3, a visualization sensor 4, and an abnormality determination device 5. The housing 2, the oil supply channel 3, the visualization sensor 4, and the abnormality determination device 5 constitute a "foreign object recognition system" according to the present disclosure.

The housing 2 houses a clutch (forward/reverse clutch, speed stage clutch, etc.) and a shaft (input shaft, intermediate shaft, output shaft, etc.). In the present embodiment, a wet multi-plate clutch having a plurality of clutch discs is used as the clutch. A friction material constituted by a non-magnetic material (paper-based material, etc.), for example, is affixed to a core plate surface of the clutch discs with an adhesive (e.g., phenolic resin). The friction material is constituted by a plurality of segments arranged in a matrix.

Oil that is supplied to the clutch and shaft circulates inside the housing 2. A tank 10 is provided in a lower end portion of the housing 2. The oil is stored in the tank 10. A hydraulic pump 20 is provided in an upper portion of the housing 2. When the transmission 1 is operating, the hydraulic pump 20 sucks oil stored in the tank 10 out via the oil supply channel 3 and lubricates the parts inside the transmission 1. When the transmission 1 is operating, oil used to lubricate the parts drops down under gravity and returns to the tank 10 again.

The oil supply channel 3 is attached to the housing 2. The oil supply channel 3 is an oil channel for supplying oil within the housing 2. The lower end of the oil supply channel 3 is connected to the tank 10, and the upper end of the oil supply channel 3 is connected to the hydraulic pump 20. When the transmission 1 is operating, oil is sucked out by the hydraulic pump 20 and flows upward from below along the oil supply channel 3. When the transmission 1 stops operating, the hydraulic pump 20 stops sucking out oil, and the oil accumulated within the oil supply channel 3 flows downward from above along the oil supply channel 3.

The visualization sensor 4 is attached to the tank 10. In the present embodiment, the visualization sensor 4 is inserted into an insertion hole **10*a* formed on the outer wall of the tank 10**.

The visualization sensor 4 is an example of a "foreign object recognition device" according to the present disclosure. The visualization sensor 4 recognizes foreign objects contained in the oil stored in the tank 10. Specifically, the visualization sensor 4 generates captured image data by capturing images of foreign objects contained in the oil and transmits the captured image data to the abnormality determination device 5. The configuration of the visualization sensor 4 will be described later.

The abnormality determination device 5 is connected to the visualization sensor 4. The abnormality determination device 5 acquires the captured image data from the visualization sensor 4. The abnormality determination device 5 estimates the size of foreign objects recognized by the visualization sensor 4, based on the captured image data. The abnormality determination device 5 determines whether the water content of the oil is abnormal, based on the size of the foreign objects. The abnormality determination device 5 determines that the water content of the oil is abnormal, when the size of the foreign objects is greater than or equal to a threshold value.

Here, when the water content of the oil is high, the adhesive on the core plate surface of the clutch discs decomposes and the friction material peels off in segments. Accordingly, it can be determined whether the water content of the oil is abnormal, by setting the threshold value according to the size of the segments.

Tank 10

Figure 2:
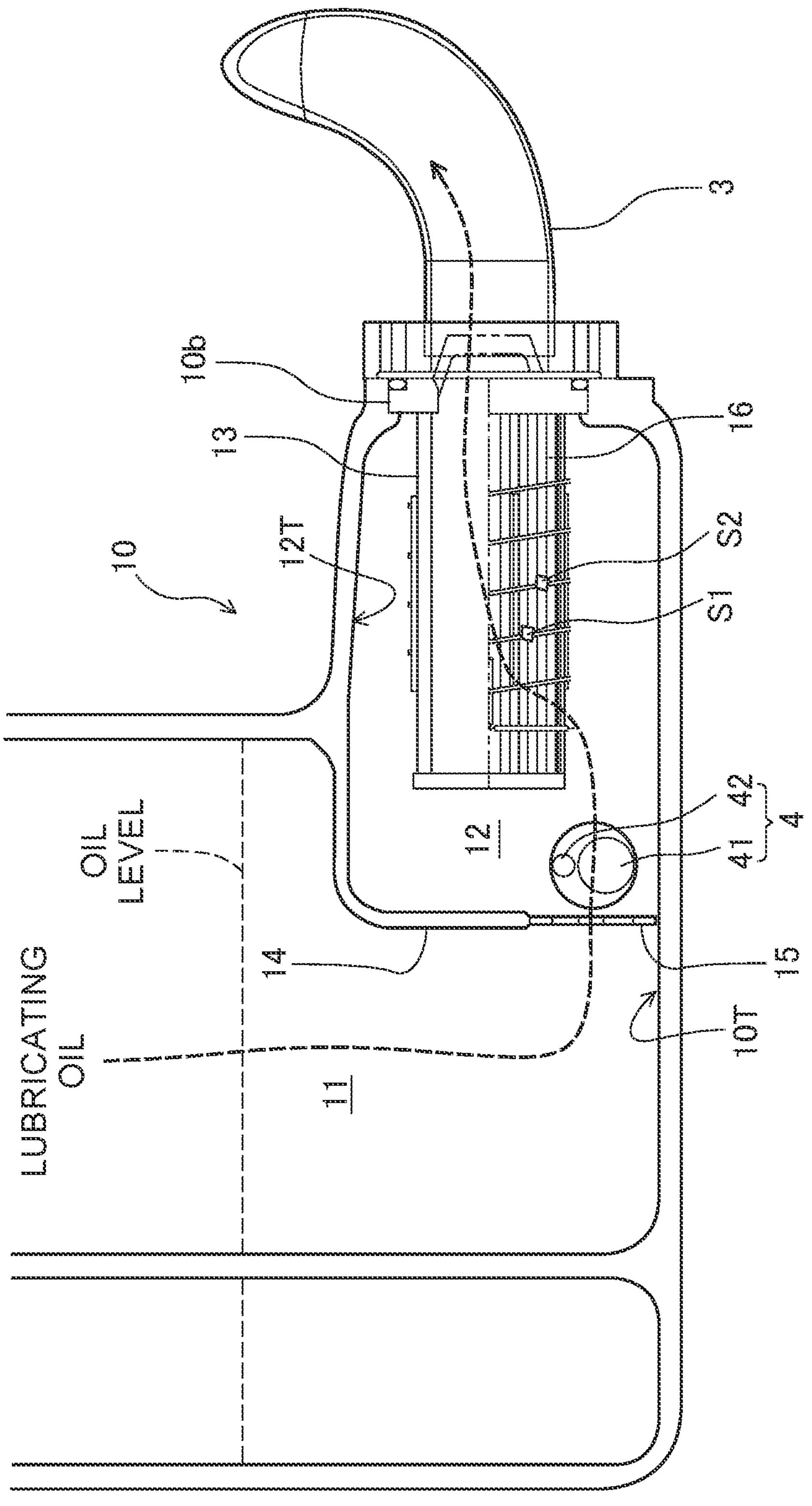
FIG. 2 is a cross-sectional view of a tank according to the embodiment.
Figure 3:
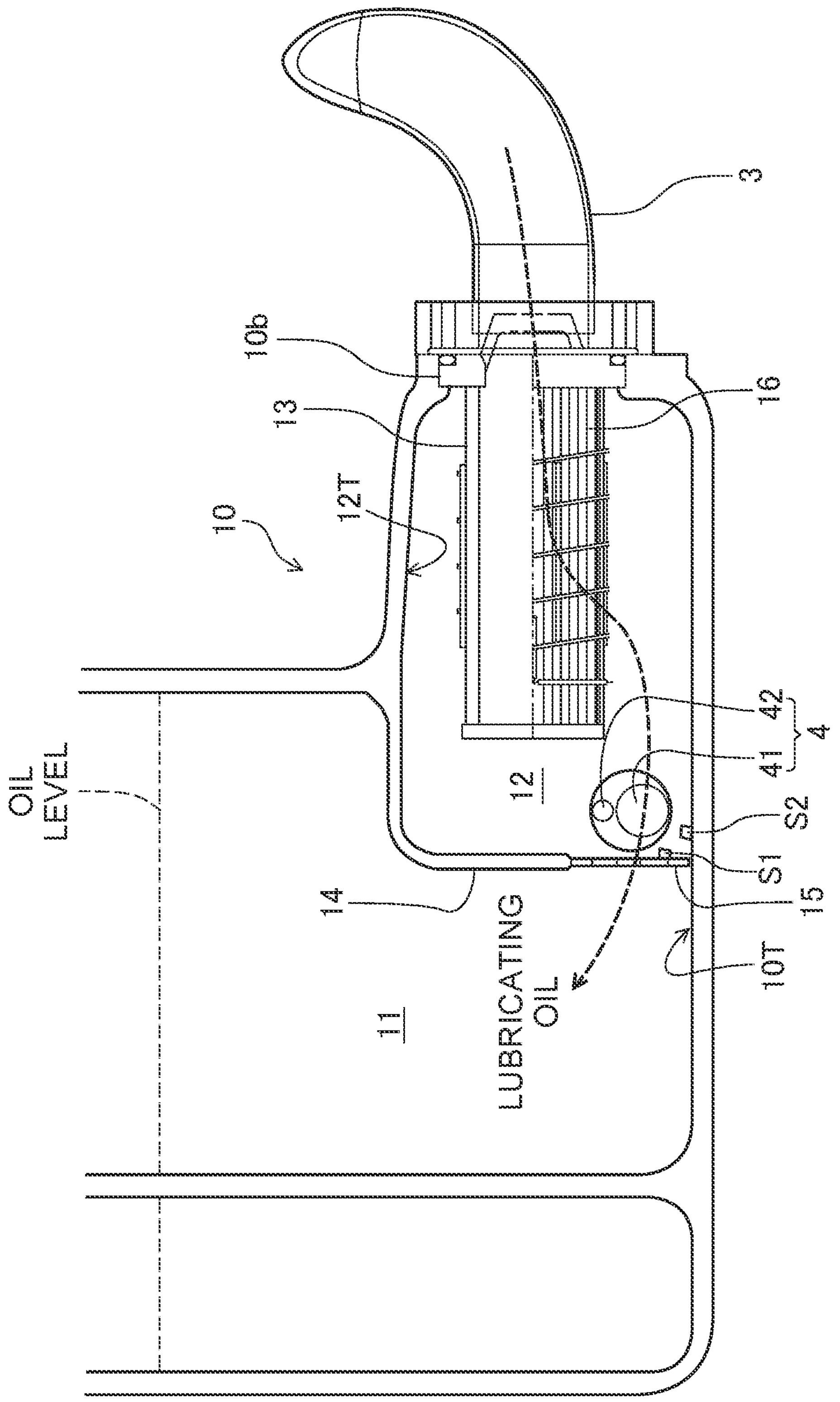
FIG. 3 is a cross-sectional view of the tank according to the embodiment.

FIGS. 2 and 3 are cross-sectional views of the tank 10 sectioned vertically. FIG. 2 illustrates the transmission 1 during operation, and FIG. 3 illustrates the transmission 1 after having stopped operation. In FIGS. 2 and 3, the circulation direction of the oil is indicated by a dashed line.

The tank 10 has a first space 11, a second space 12, a strainer 13, a partition wall 14, and a mesh member 15.

As shown in FIG. 2, when the transmission 1 is operating, oil flows into the first space 11 from above. The oil that has flowed into the first space 11 flows into the second space 12. Oil is stored in the first space 11.

The second space 12 communicates with the first space 11. In the circulation direction of oil, the second space 12 is located downstream of the first space 11. The second space 12 is for suppressing oil aeration. The second space 12 is smaller in volume than the first space 11. The second space 12 is constantly filled with oil, regardless of whether the transmission 1 is operating or not operating. Accordingly, as shown in FIGS. 2 and 3, an upper surface 12T of the second space 12 is constantly below the oil level.

As shown in FIG. 2, when the transmission 1 is operating, oil used to lubricate the parts drops down under gravity and flows into the first space 11. Oil that has flowed from the first space 11 into the second space 12 through the mesh member 15 flows into the strainer 13.

The strainer 13 separates out foreign objects contained in the oil flowing from the second space 12 into the oil supply channel 3. In the present embodiment, the strainer 13 is disposed in the second space 12. The strainer 13 is inserted into an insertion hole 10*b* formed in the outer wall of the tank 10. As shown in FIG. 2, when the transmission 1 is operating, oil inside the second space 12 flows to the oil supply channel 3 via the strainer 13. The strainer 13 has a filter medium 16 for filtering out coarse foreign objects contained in the oil. The filter medium 16 can be constituted by filter paper (e.g., non-woven fabric) or metal mesh. The filter medium 16 may be a pleated filter medium. Coarse foreign objects contained in the oil are separated out from the oil by the filter medium 16. Here, FIG. 2 illustrates a state in which two segments S1 and S2 that have become detached from the clutch discs are separated out by the strainer 13. Segments S1 and S2 are examples of "foreign objects" according to the present disclosure. The strainer 13 has a large surface area, making it difficult to recognize segments S1 and S2 when they are adhered to the strainer 13. In view of this, in the present embodiment, recognition is performed when segments S1 and S2 are detached from the strainer 13, as will be described later.

The partition wall 14 is provided inside the tank 10. The partition wall 14 is disposed between the first space 11 and the second space 12. The partition wall 14 extends downward from above. A lower end portion of the partition wall 14 is spaced away from a bottom surface 10T of the tank 10. Accordingly, the partition wall 14 partitions the first space 11 from the second space 12, but the first space 11 and the second space 12 communicate with each other via the space downward of the partition wall 14. The boundary between the first space 11 and the second space 12 can be defined by an extension plane extending vertically downward from the lower end portion of the partition wall 14.

The mesh member 15 is disposed downward of the partition wall 14. In the present embodiment, an upper end portion of the mesh member 15 is connected to the lower end portion of the partition wall 14, and a lower end portion of the mesh member 15 is connected to the bottom surface 10T.

The mesh member 15 has mesh (holes). Metal mesh, perforated metal or the like can be used as the mesh member 15. The size of the mesh is large enough to allow segments S1 and S2 detached from the clutch discs to pass through with the flow of oil. Thus, the occurrence of suction failure of the hydraulic pump 20 caused by segments S1 and S2 getting stuck in the mesh of the mesh member 15 can be suppressed.

As shown in FIG. 2, when the transmission 1 is operating, segments S1 and S2 pass through the mesh member 15 from the first space 11 to the second space 12 with the flow of oil. As shown in FIG. 3, after the transmission 1 stops operating, the oil inside the oil supply channel 3 flows back to the first space 11 from the second space 12 via the mesh member 15, but the flow (flow velocity) of the oil at this time is much slower than the flow (flow velocity) of the oil when the transmission 1 is operating. Thus, segments S1 and S2 are caught by the mesh of the mesh member 15 and deposited on the bottom surface 10T or get trapped in the mesh of the mesh member 15. As a result, segments S1 and S2 are located in a narrow range on the strainer 13 side of the mesh member 15. Since the range in which segments S1 and S2 are located is smaller than the surface area of the strainer 13, recognition of segments S1 and S2 by the visualization sensor 4 described later is facilitated.

Note that since foreign objects smaller than segments S1 and S2 pass through the mesh member 15 and move into the first space 11, only coarse foreign objects that indicate the possibility of the transmission 1 being damaged collect on the strainer 13 side of the mesh member 15. Thus, as will be described later, coarse foreign objects indicating the possibility of the transmission 1 being damaged can be accurately recognized.

Here, the visualization sensor 4 is disposed in a position where the strainer 13 side of the mesh member 15 can be recognized. In the present embodiment, the visualization sensor 4 is disposed on the strainer 13 side of the mesh member 15 but may be disposed on the opposite side of the mesh member 15 to the strainer 13. Even when disposed on the opposite side of the mesh member 15 to the strainer 13, the visualization sensor 4 is able to recognize segment S1 trapped in the mesh of the mesh member 15.

The visualization sensor 4 has an image capturing device 41 and a light fitting 42. The image capturing device 41 captures images of segments S1 and S2 located on the strainer 13 side of the mesh member 15. The image capturing range of the image capturing device 41 is set to include the surface of the mesh member 15 on the strainer 13 side and a region of the bottom surface 10T on the strainer 13 side of the mesh member 15. The light fitting 42 illuminates the image capturing range of the image capturing device 41.

As described above, the visualization sensor 4 recognizes segments S1 and S2 that are located downward of the partition wall 14. Specifically, the visualization sensor 4 recognizes segments S1 and S2 that are located on the strainer 13 side of the mesh member 15. Accordingly, even a small number of coarse foreign objects separated out by the strainer 13 can be recognized at an early stage using a sensor with a limited recognition range such as a visualization sensor. Therefore, coarse foreign objects indicating the possibility of the transmission 1 being damaged can be recognized quickly and accurately. As a result, as described above, the abnormality determination device 5 is able to quickly and accurately determine whether the water content of the oil is abnormal.

Variations of Embodiment

The present invention is not limited to an embodiment such as the above, and various variations or modifications can be made without departing from the scope of the invention.

Variation 1

Figure 4:
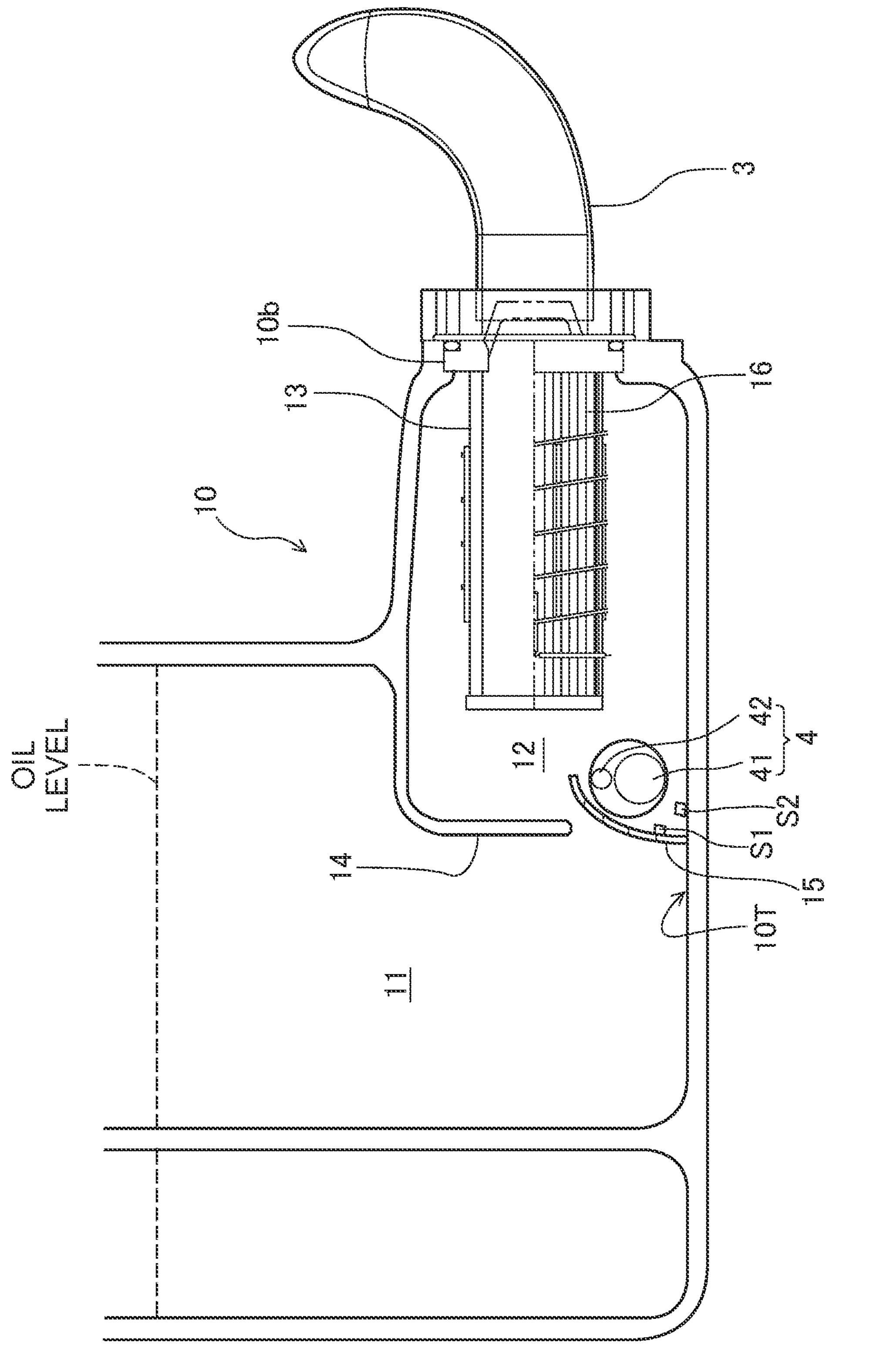
FIG. 4 is a cross-sectional view of a tank according to variation 1.

In the above embodiment, the upper end portion of the mesh member 15 is connected to the lower end portion of the partition wall 14 but may be spaced away from the lower end portion of the partition wall 14 as shown in FIG. 4.

Variation 2

In the above embodiment, the tank 10 has the mesh member 15 but need not necessarily have the mesh member 15. Even if the tank 10 does not have the mesh member 15, foreign objects can be recognized by appropriately setting the image capturing range of the visualization sensor 4.

Figure 5:
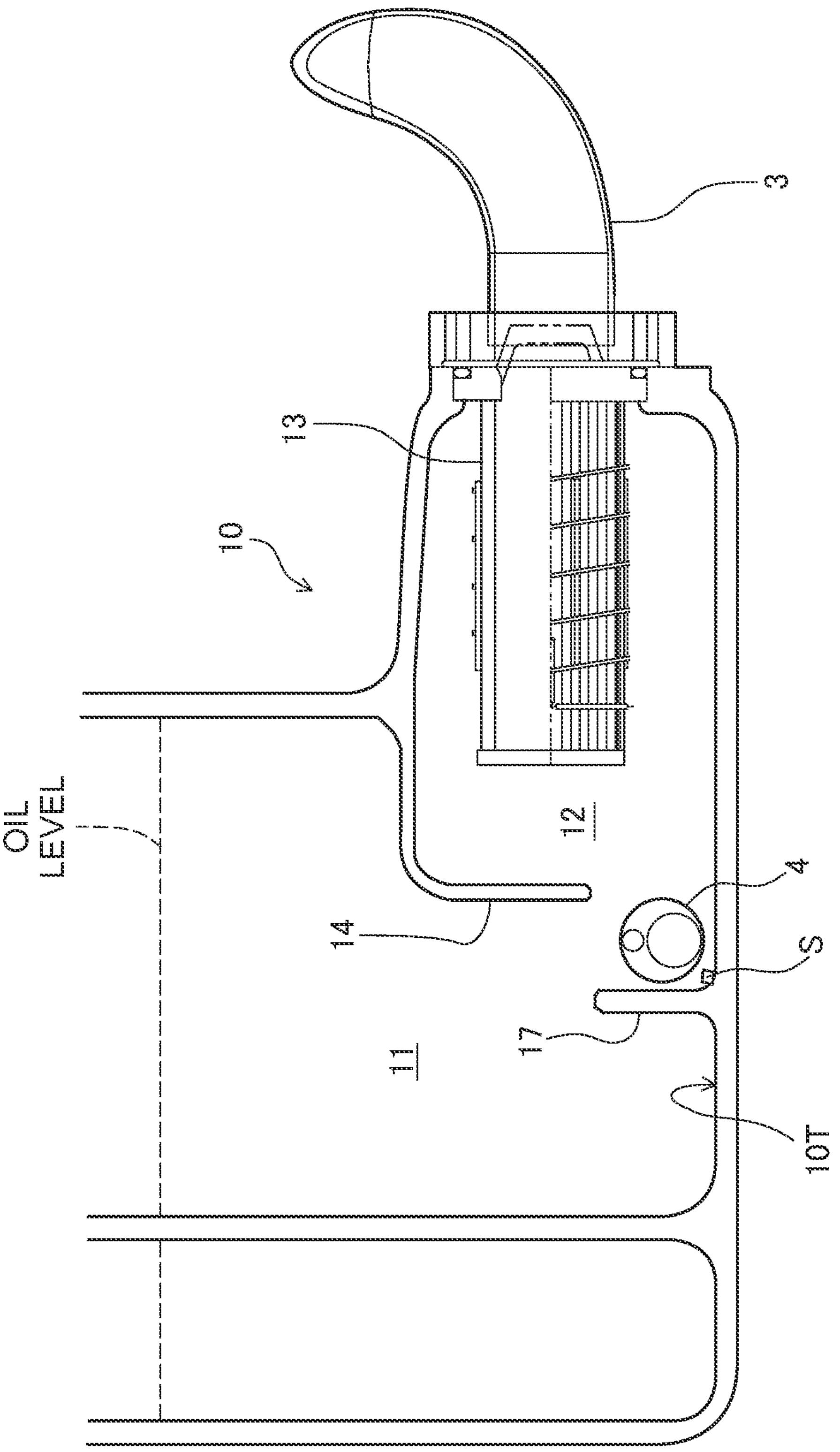
FIG. 5 is a cross-sectional view of a tank according to variation 2.

When the tank 10 does not have the mesh member 15, the tank 10, as shown in FIG. 5, preferably further has a deposition wall 17 extending upward from the bottom surface 10T. After the transmission 1 stops operating, foreign object S contained in oil flowing back to the first space 11 from the second space 12 can be stopped by the deposition wall 17. Since foreign object S cannot get over the deposition wall 17 and is deposited on the bottom surface 10T, foreign object S located on the strainer 13 side of the deposition wall 17 can be recognized by the visualization sensor 4.

Variation 3

In the above embodiment, the visualization sensor 4 is used as the foreign object recognition device, but the present disclosure is not limited thereto. A contactless sensor capable of recognizing foreign objects can be used as the foreign object recognition device. A sensor (e.g., fiber sensor, photoelectric sensor, etc.) that is able to recognize foreign objects based on the refractive index of light can be used as the contactless sensor, in addition to the visualization sensor 4 that is able to capture foreign objects as images.

Variation 4

In the above embodiment, the strainer 13 is disposed in the second space 12 of the tank 10 but may be incorporated into the oil supply channel 3.

Variation 5

In the above embodiment, the case where the foreign object recognition system according to the present disclosure is applied to a transmission is described, but the foreign object recognition system according to the present disclosure is applicable to an axle apparatus, a brake apparatus, or the like in addition to a transmission. Note that the foreign object recognition system need only include at least a housing, an oil supply channel, and a foreign object recognition device.

Supplementary Note 1

A foreign object recognition system provided with a housing including a tank that stores oil, an oil supply channel attached to the housing, and a foreign object recognition device, the tank including a first space, a second space communicating with the first space, a strainer that separates out foreign objects contained in oil flowing from the second space into the oil supply channel, and a partition wall disposed between the first space and the second space and extending downward from above, and the foreign object recognition device recognizing foreign objects located downward of the partition wall.

Supplementary Note 2

The foreign object recognition system according to supplementary note 1, in which the tank further includes a mesh member disposed downward of the partition wall, and the foreign object recognition device recognizes the strainer side of the mesh member.

Supplementary Note 3

The foreign object recognition system according to supplementary note 1, in which the tank further includes a deposition wall extending upward from a bottom surface of the tank, and the foreign object recognition device recognizes foreign objects located on the strainer side of the deposition wall.

Supplementary Note 4

The foreign object recognition system according to any one of supplementary notes 1 to 3, in which the foreign object recognition device is a sensor configured to recognize foreign objects.

Supplementary Note 5

The foreign object recognition system according to any one of supplementary notes 1 to 4, in which the housing houses a clutch disc to which the oil is supplied.

Supplementary Note 6

The foreign object recognition system according to supplementary note 5, in which a friction material of the clutch disc is constituted by a non-magnetic material.

Supplementary Note 7

The foreign object recognition system according to supplementary note 5 or 6 further provided with an abnormality determination device connected to the foreign object recognition device, and in which the abnormality determination device determines whether a water content of the oil is abnormal, based on a size of foreign objects recognized by the foreign object recognition device.

Supplementary Note 8

The foreign object recognition system according to any one of supplementary notes 1 to 7, in which the second space is smaller in volume than the first space.

Supplementary Note 9

The foreign object recognition system according to any one of supplementary notes 1 to 8, in which an upper surface of the second space is constantly located below a level of the oil.

The invention claimed is:

1. A foreign object recognition system comprising:
a housing including a tank configured to store oil;
an oil supply channel attached to the housing; and
a foreign object recognition device,
the tank including
a first space,
a second space communicating with the first space,
a strainer configured to separate out foreign objects contained in oil flowing from the second space into the oil supply channel, and
a partition wall disposed between the first space and the second space and extending downward from above, and the foreign object recognition device being configured to recognize a foreign object located downward of the partition wall.

2. The foreign object recognition system according to claim 1, wherein the tank further includes a mesh member disposed downward of the partition wall, and the foreign object recognition device is configured to recognize a strainer side of the mesh member.

3. The foreign object recognition system according to claim 1, wherein the tank further includes a deposition wall extending upward from a bottom surface of the tank, and the foreign object recognition device is configured to recognize a foreign object located on a strainer side of the deposition wall.

4. The foreign object recognition system according to claim 1, wherein the foreign object recognition device is a sensor configured to recognize foreign objects.

5. The foreign object recognition system according to claim 1, wherein the housing houses a clutch disc to which the oil is supplied.

6. The foreign object recognition system according to claim 5, wherein a friction material of the clutch disc is constituted by a non-magnetic material.

7. The foreign object recognition system according to claim 5, further comprising:

an abnormality determination device connected to the foreign object recognition device, the abnormality determination device being configured to determine whether a water content of the oil is abnormal, based on a size of a foreign object recognized by the foreign object recognition device.

8. The foreign object recognition system according to claim 1, wherein the second space is smaller in volume than the first space.

9. The foreign object recognition system according to claim 1, wherein an upper surface of the second space is constantly located below a level of the oil.

* * * * *